United States Patent [19]
Garay

[11] Patent Number: 4,545,619
[45] Date of Patent: Oct. 8, 1985

[54] DETACHABLE ARM REST FOR A MOTOR VEHICLE

[76] Inventor: Moses D. Garay, 1610 Fallbrook Ave., San Jose, Calif. 95130

[21] Appl. No.: 438,248

[22] Filed: Nov. 1, 1982

[51] Int. Cl.[4] ............................................... A47C 7/54
[52] U.S. Cl. .................................. 297/416; 297/170; 297/417
[58] Field of Search ............... 297/135, 160, 162, 170, 297/411, 416, 417; 108/48

[56] References Cited

U.S. PATENT DOCUMENTS

| | | | |
|---|---|---|---|
| 414,392 | 11/1889 | Findley | 297/170 X |
| 484,187 | 10/1892 | Elston | 297/170 X |
| 1,252,192 | 1/1918 | Stanford | 297/416 |
| 3,680,911 | 8/1972 | Dupuis | 297/162 |

FOREIGN PATENT DOCUMENTS 191515  6/1973  Switzerland ..................... 297/416

Primary Examiner—William E. Lyddane
Assistant Examiner—Peter R. Brown
Attorney, Agent, or Firm—Leonard R. Cool

[57] ABSTRACT

A detachable arm rest for a passenger seat includes a vertical member supported at one end thereof from the floor of a motor vehicle, and is adapted for attachment to the inboard side of the seat near the front edge thereof; a horizontal member extending from the other end of said vertical member, said horizontal member being adapted for connection to the back support portion of said seat, and an extension member attached to the top side of said horizontal member thereby providing a supporting surface for the interior arm.

11 Claims, 17 Drawing Figures

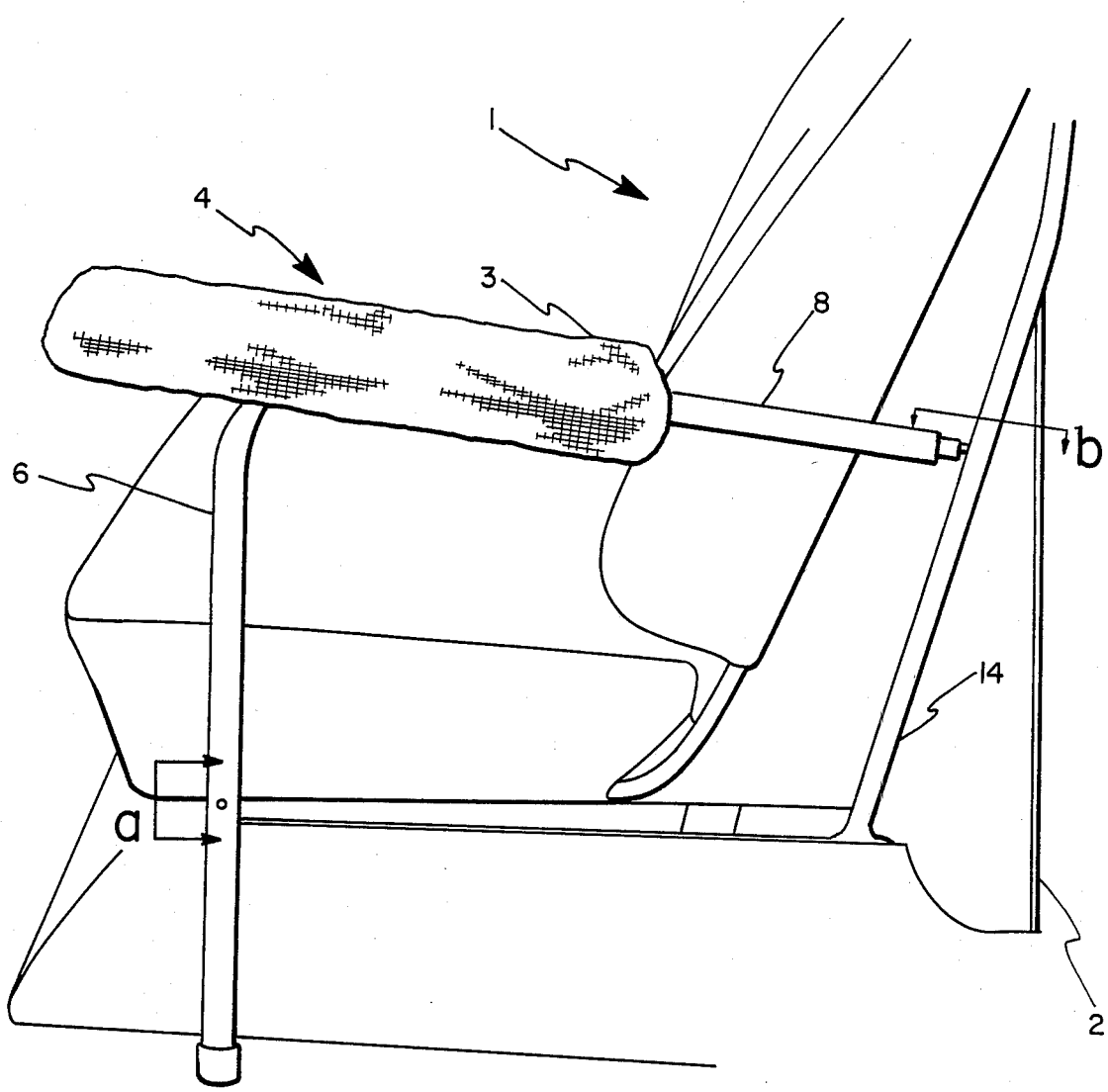
FIG. IA
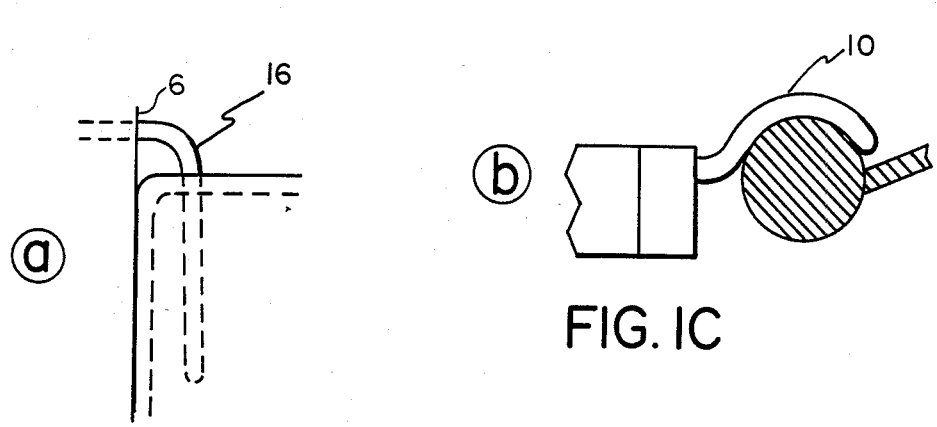
FIG. IB
FIG. IC

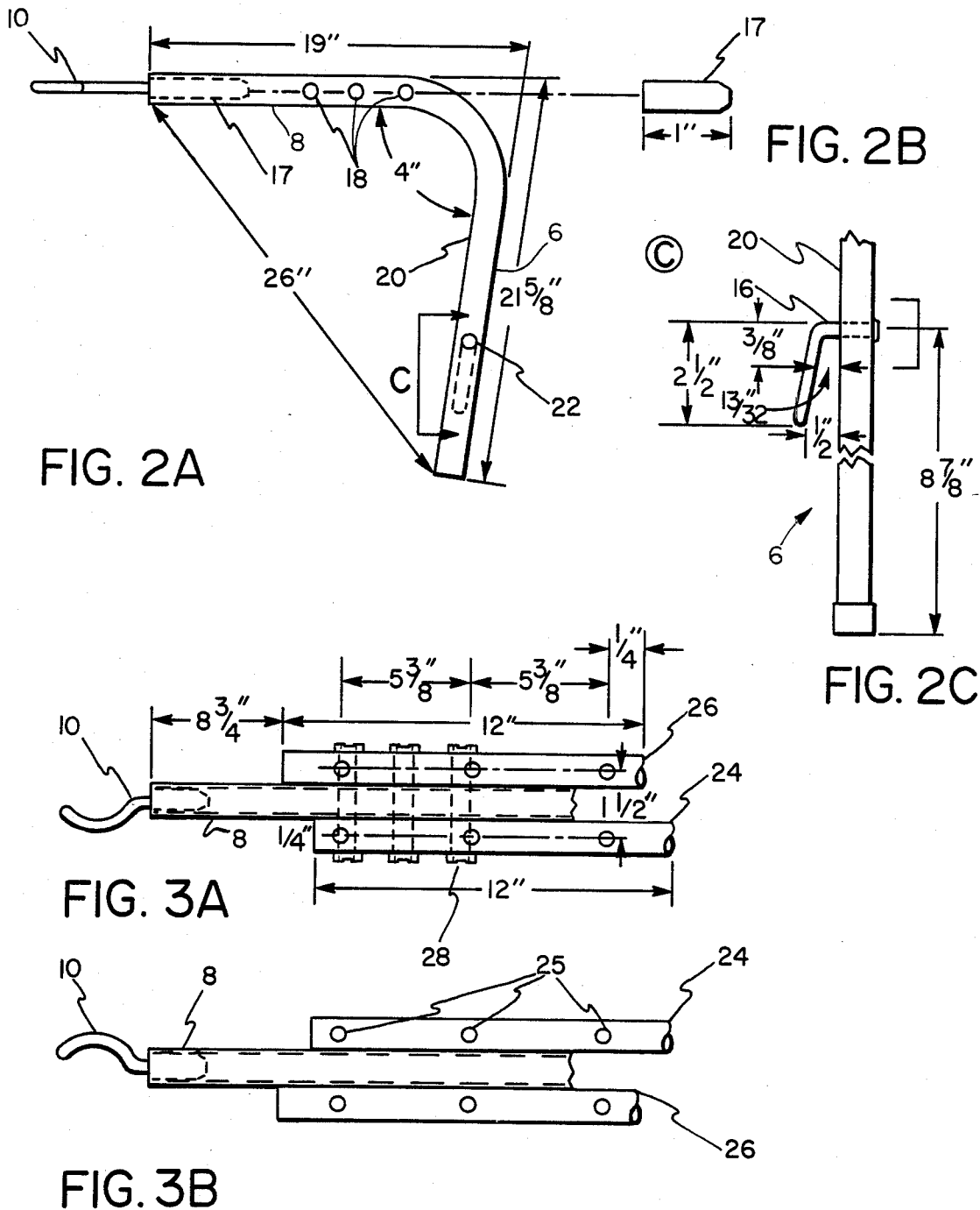

DETACHABLE ARM REST FOR A MOTOR VEHICLE

BACKGROUND OF THE INVENTION

1. Field of the Invention

This invention generally relates to seating and, in particular, to arm rests for automobiles, and more particularly to arm rests which are adapted for detachable installation on the forward bucket type seats such as are found on a VW Bus.

2. Background Description

Although riding quality of automobiles has been an area of concern to the automobile manufacturers over the years, personal comfort has often been given short shrift. Instead, the exterior design features and high-speed performance have been the features extolled. While the seats have not been totally uncomfortable, very little thought seems to have been given to what the passengers are to do with their arms. It is only in the more expensive models that one finds such amenities as arm rests. But even here they are normally provided on the door side, as the arm rests are molded into the interior of the door. Occasionally one finds, in the bench seat models, an arm rest that can be pulled down into position between the passengers in the front seat. It is interesting to note that these are often useless as they are so remote from the passenger if they are positioned to be effectively used by the driver.

In the VW Bus, bucket type seats are installed at the driver and front seat passenger locations, and they are separated in order to permit passage from the front through to the rear of the interior. Not only is this design devoid of an arm rest for the left arm of the passenger, but a solution to this problem, until now, has not been readily apparent.

SUMMARY OF THE INVENTION

A detachable arm rest for a bucket type seat includes vertical and horizontal support members that are connected to each other and, respectively, to the inboard side of the seat and back portions of the seat support of the bucket seat such as used in a VW Bus; and an extension member in the form of a table is attached to the top of said horizontal support section so as to provide a supporting surface for the inboard arm of the rider.

BRIEF DESCRIPTION OF THE DRAWINGS

FIG. 1A is a perspective side view of a bucket type seat (1) and seat support (2) showing the arm rest (4) of a preferred embodiment of the invention attached thereto;

FIG. 1B is a detail drawing taken at a, FIG. 1, showing a preferred method for securing the vertical support member (6) to the forward inboard side of the horizontal section of said seat support member;

FIG. 1C is a detail drawing taken at b, FIG. 1A, showing how frame support member (10) extends from support member (8) and is positioned to rest against the tubular upright section (14) of said seat support;

FIG. 2A is a side view of the vertical (6) and horizontal (8) support members and shows the holes (18) used in the assembly of the arm rest table support members;

FIG. 2B is a front view of a wooden dowel (17) used to attach the back frame support member to one end of the seat support frame;

FIG. 2C is a front view of the vertical support member (6) illustrating the location and shape of the rod (16) used to secure the vertical member to the seat support frame;

FIG. 3A is a cut-away top view of the horizontal support member (8) and illustrates the manner in which the table support members (24 and 26) are attached thereto;

FIG. 3B is a bottom view which illustrates the location of the mounting holes (25) for the table plates;

DESCRIPTION OF THE PREFERRED EMBODIMENT

Figure 4A:
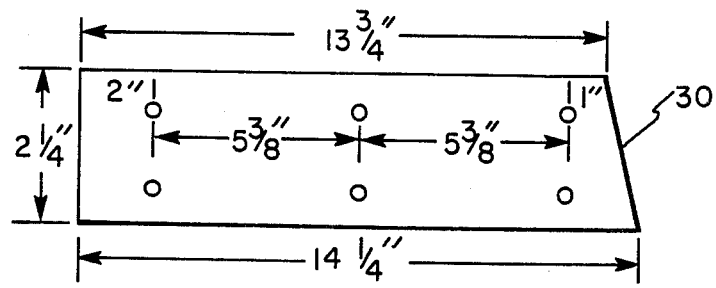
FIG. 4A shows the top table plate (30) and the location of the mounting holes therein.

Referring now to FIG. 1A the detachable arm rest and its relationship to its environment may be seen. The view is from the inboard side looking toward the door not shown. The bucket seat 1 is slidably attached to seat support 2 which permits adjustment of the seat as is well known. The vertical support member 6 of arm rest 4 is attached to the seat support member 2 at a location well forward along the horizontal portion of said seat support member 2, shown at a in the drawing. The vertical member is resting on the floor, and this support plus the attachment at a holds the arm in place and tends to prevent lateral movement thereof. The horizontal member 8 is attached to the upright position of said seat support member, and the connection provides additional holding force against lateral movement as well as forward movement of the arm rest. The manner in which these attachments are made is shown in FIGS. 1B and 1C.

Referring now to FIG. 1B it may be seen that an L shaped rod 16 has the short end fitted into the vertical member 6 of the arm rest. The rod may be welded to the vertical member or the end may be threaded and the attachment made by fastening the threaded portion to the vertical member. The long end of the L-shaped rod is spaced from the vertical member, providing the separation necessary to allow the vertical member to pass along the inboard side of the horizontal seat support, and yet it is positioned to be insertable in an opening which exists in the horizontal support member. As shown, the long end of the L extends downward and at a slight angle which is away from the vertical member to facilitate the attachment.

Referring now to FIG. 1C, it may be seen that the horizontal member 8 of the arm rest is adapted for engagement with the tubular upright section 14 of the vertical seat support section by use of a frame support member 10. It should be understood that the hook is located so that it will at least partially withstand lateral pressure toward the interior, and provides some stability to forward and backward motion. Referring again to FIG. 1A, the arm rest 4, which is shown padded, provides the arm support desired. The details of the structure will be described subsequently.

Referring now to FIG. 2A the preferred manner of forming the master frame for the seat support may be seen. A thin wall metal tubing, having an inside diameter of ⅜ inch, and a length of 37 and ½ inches is bent so as to provide a slight inclination from the vertical of the vertical support member 6. The drawing is not to scale, but the dimensiions shown are ones that provided satisfactory performance on a prototype of the arm rest structure. As may also be seen, in the prototype, the L shaped vertical holding member was spot welded to the frame. The holes 18 shown in the horizontal member are used in the mounting of the table plate assembly as will be shown subsequently. The hooked member 10 is attached by press fitting it into a wood dowel 17, that is also press fitted into the end of the horizontal member as shown at the left of the figure. The dowel structure is shown in detail in FIG. 2B, but other means of attaching the hooked member 10 may be used. As shown in FIG. 2C, the L shaped member 16 is a round steel rod initially about 4 inches in length. It is formed into the L type shape but with the two sections of about equal length. In order to weld the rod 16 to the vertical support member 20, a portion of the angled member must extend through the metal tubing. Thus, in the assembled condition, the rod appears more like a L. As noted, the the vertical portion of rod 16 is angled slightly away from the vertical member 20. This is slightly exaggerated in the figure, as the variation is less than ¼ inch from top to bottom.

Figure 4B:
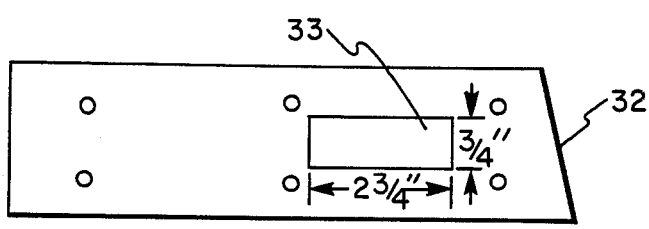
FIG. 4B shows the bottom table plate (32), the location of the mounting holes and the opening (33) through which the vertical support member is passed during installation.

The manner of forming the arm engaging portion of the arm rest is illustrated in FIGS. 3A and 3B. A table is formed by attaching a top plate 30 and a bottom plate 32 to pieces of thin wall metal tubing 24 and 26, as shown in FIG. 3A, which are attached to the horizontal member 8 by means of three machine screws as shown, or they may be spot welded. These are identified as table support members 24 and 26. Each of the table support members have holes 25 drilled in the vertical direction with respect to horizontal support member 8. The top and bottom plates 30 and 32, respectively, are shown in FIGS. 4A and 4B. Note that holes are drilled in these plates to match those of the vertical holes 25 of FIG. 3B. Also, there is a notch 33 cut out of the bottom plate 32 to permit the passage of the vertical support 20 therethrough in the assembled condition.

Figure 4C:
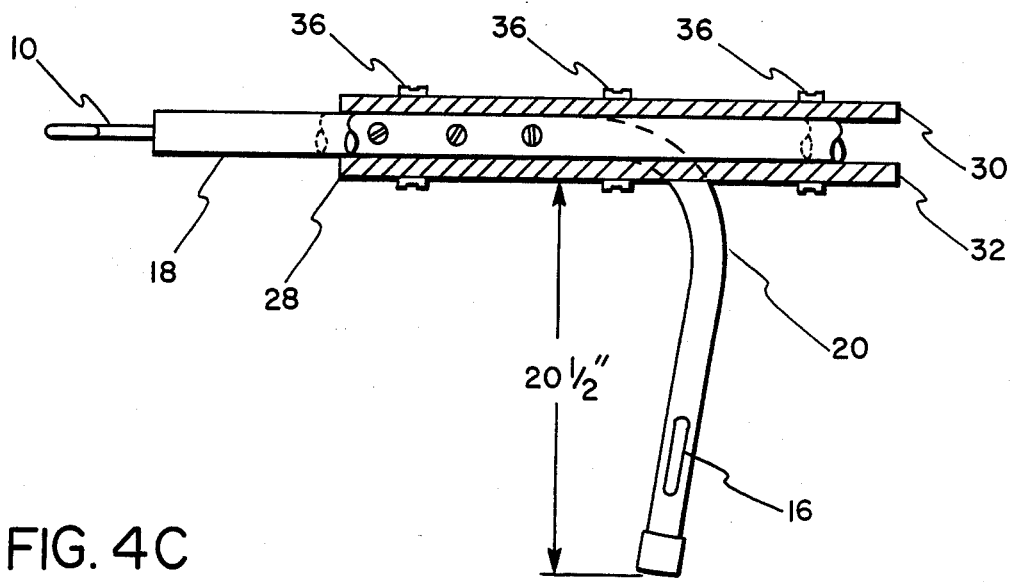
FIG. 4C shows the top and bottom table plates attached to the table supports and the horizontal member of said detachable arm rest.

A side view of the completed assembly is shown in FIG. 4C. The bottom plate has been slipped up the vertical member using the notch 33 and the top and bottom plates are secured to the table support members by means of machine screws 36. To provide the desired comfort for an arm rest, the table is padded and upholstered. This can be done by padded VINYL or other suitable material.

Figure 5A:
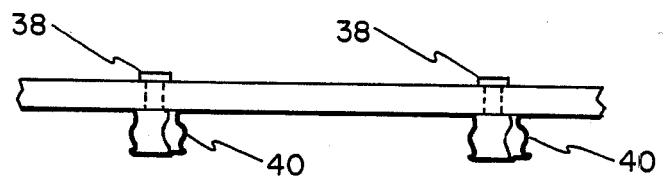
FIG. 5A is a side sectional view of the bottom part of a table illustrating the spring clips (40) in which the vertical support member may be attached.
Figure 5B:
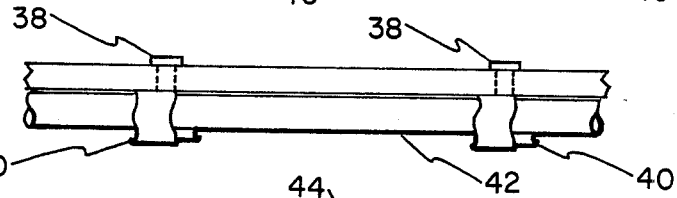
FIG. 5B is a side sectional view showing the vertical support member (42) inserted in the clips (40)
Figure 5C:
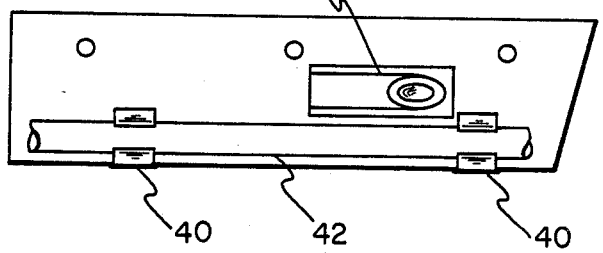
FIG. 5O is a bottom view of the bottom table plate illustrating the vertical support member (42) inserted in clips (40) and the horizontal support member (44)
FIG. 5D is a side view of an assembled arm rest in which the vertical and horizontal support members consists of two parts which are assembled together at junction d.
FIG. 5E is a detail of the junction d.
Figure 5D:
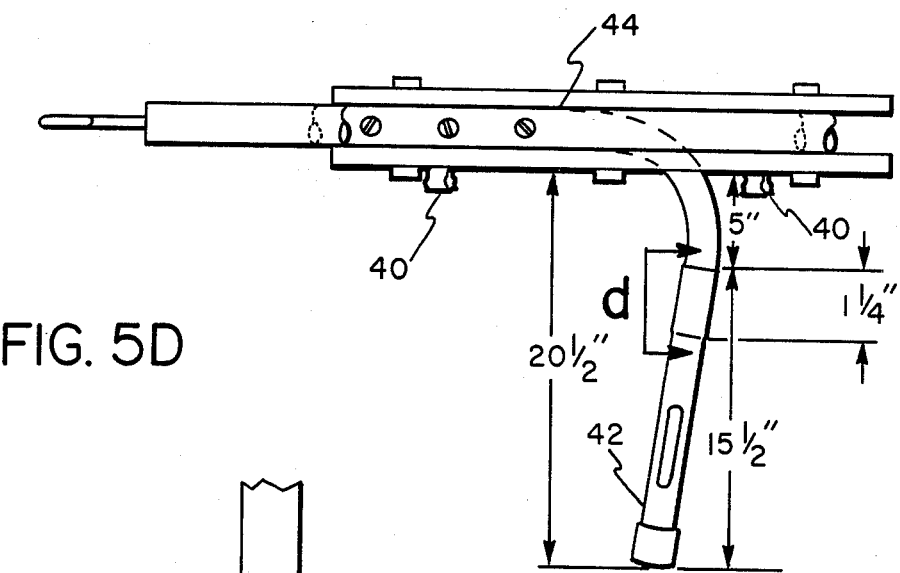
Figure 5E:
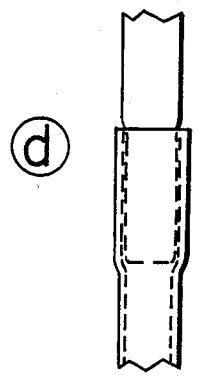

Another embodiment of the invention is illustrated in FIG. 5D, the elements being illustrated in more detail in FIGS. 5A–5C and FIG. 5E. To facilitate storage when not in use the vertical portion of the horizontal and vertical support members are made up of two separate sections. Referring to FIG. 5D it may be seen that the horizontal support member 44 actually extends beyond the knee and is joined with the vertical support member 42 at "d". As shown in FIG. 5E, the junction is a tight slip fit which permits separation of member 42 when the arm rest is not in use. For storage, the member 42 may be inserted in clips 40, which are attached to the underside of the bottom table plate 32 as shown in FIGS. 5A–5C.

Figure 6:
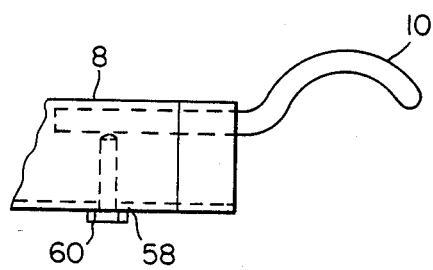
FIG. 6 is a sectional plan view of horizontal support member (8), and frame support member (10) held in position by set screw (60).

The frame support member 10 may also be mounted as shown in FIG. 6. Here a threaded aperture 58 is formed in one side of horizontal support member 8 near the rear end thereof. The member 8 is tubular and the frame (hooked) support member 10 is inserted in the open end thereof. A set screw 60 is screwed into threaded aperture 58 and is tightened to hold member 10 in position.

While the invention has been disclosed in accordance with a preferred embodiment thereof, it should be understood, that other arrangements can be made without departing from the spirit and scope of the invention.

What is claimed is:

1. A detachable arm rest for a bucket type seat comprising:
    a vertical support member having one end thereof adapted to rest on the floor of the vehicle adjacent the inboard side of a seat support member;
    means for interconnecting said vertical support member with said seat support member at a position near the forward edge and on the inboard side thereof comprising a rod attached to said vertical support at a location that is above that of said seat support member and inclined at an angle so as to intersect the inboard side of said seat support near the forward edge thereof and to mate with an opening in said seat support;
    a horizontal support member having one end thereof adapted for attachment to the other end of said vertical support member;
    means for interconnecting said horizontal support member with the inboard side of the back rest portion of said seat support member; and
    table means for providing said arm rest, said table means being adapted for attachment to said horizontal support member.

2. A detachable arm rest as set forth in claim 1 wherein said rod is formed in an L shape and the short end is inserted in an opening in the vertical support member and welded thereto.

3. A detachable arm rest as set forth in claim 1 wherein said second means comprises:
    a second rod having a straight portion and an arcuate portion; and
    means for securing said straight portion to the end of the horizontal member adjacent said seat back and in such a manner that said arcuate portion is in a horizontal plane and is aligned to intersect the upright portion of the seat support frame.

4. A detachable arm rest as set forth in claim 3 wherein said horizontal member is a hollow cylindrical pipe.

5. A detachable arm rest as set forth in claim 4 wherein said means for securing said straight portion of said second rod comprises:

a wooden plug having an opening therein in which said straight rod portion is inserted; said wooden plug being press fitted into the end of said horizontal member.

6. A detachable arm rest as set forth in claim 3 wherein said means for securing said straight portion of said second rod comprises:
- an opening drilled through said horizontal member at a location near the end thereof that is adjacent said seat back;
- a second clamping means attached via said opening and clamped to said rod whereby said rod is held in position to support said arm rest against axial movement.

7. A detachable arm rest as set forth in claim 6 wherein said horizontal member is a hollow cylindrical pipe having a threaded opening through one side thereof; said straight portion of said second rod being inserted in the end of said pipe adjacent said opening and a set screw inserted in said threaded opening and pressing against said rod to clamp it securely in place.

8. Apparatus as set forth in claim 7 wherein said vertical and horizontal support members are made up from two sections which are suitably joined together.

9. Apparatus as set forth in claim 7 wherein said vertical and horizontal support members are formed of one continuous piece of hollow cylindrical metal pipe by bending said pipe to provide said vertical and horizontal support members, said bend occuring near the middle thereof.

10. Apparatus as set forth in claim 8 wherein a table is attached to said horizontal support member near the end opposite the seat back, said table providing a substantially flat surface which may be appropriately padded and covered so as to provide a suitable resting place for the arm.

11. Apparatus as set forth in claim 9 wherein a table is attached to said horizontal support member near the end opposite the seat back, said table providing a substantially flat surface which may be appropriately padded and covered so as to provide a suitable resting place for the arm.

* * * * *